United States Patent [19]

Graser et al.

[11] 4,419,427
[45] Dec. 6, 1983

[54] ELECTROPHOTOGRAPHIC MEDIUM WITH PERYLENE-3,4,9,10-TETRACARBOXYLIC ACID N,N'-BIS-(2',6'-DICHLOROPHENYL)-DIIMIDE

[75] Inventors: Fritz Graser, Ludwigshafen; Gerhard Hoffmann, Otterstadt; Reinhold J. Leyrer, Ludwigshafen; Peter Neumann, Wiesloch, all of Fed. Rep. of Germany

[73] Assignee: BASF Aktiengesellschaft, Fed. Rep. of Germany

[21] Appl. No.: 358,600

[22] Filed: Mar. 16, 1982

[30] Foreign Application Priority Data

Mar. 20, 1981 [DE] Fed. Rep. of Germany ....... 3110955

[51] Int. Cl.³ ............................ G03G 5/06; G03G 5/14
[52] U.S. Cl. ............................................ 430/58; 430/78
[58] Field of Search ........................ 430/58, 72, 76, 78

[56] References Cited

U.S. PATENT DOCUMENTS

| 3,839,034 | 10/1974 | Wiedemann | 430/58 |
| 3,871,882 | 3/1975 | Wiedemann | 430/58 |
| 3,904,407 | 9/1975 | Regensburger et al. | 430/58 |
| 3,973,959 | 8/1976 | Rochlitz et al. | 430/58 |
| 4,156,757 | 5/1979 | Graser et al. | 252/501.1 X |

FOREIGN PATENT DOCUMENTS 55-36849   3/1980   Japan .

*Primary Examiner*—Roland E. Martin, Jr.
*Attorney, Agent, or Firm*—Keil & Witherspoon

[57] ABSTRACT

An electrophotographic recording medium which consists essentially of an electrically conductive base and a photosemiconductive double layer which comprises a first layer containing charge carrier-producing dyes, and a second layer containing one or more compounds which are charge carrier-transporting when exposed to light, wherein perylene-3,4,9,10-tetracarboxylic acid N,N'-bis-(2',6'-dichlorophenyl)-diimide is employed as the charge carrier-producing dye, and the production of this recording medium.

2 Claims, No Drawings

ELECTROPHOTOGRAPHIC MEDIUM WITH PERYLENE-3,4,9,10-TETRACARBOXYLIC ACID N,N'-BIS-(2',6'-DICHLOROPHENYL)-DIIMIDE

The present invention relates to an electrophotographic recording medium which consists of an electrically conductive base and a photosemiconductive double layer composed of organic materials, and to a process for the production of this electrophotographic recording medium.

Electrophotographic recording media comprise either one homogeneous layer of a photosemiconductor, or a plurality of layers one on top of another, on an electrically conductive base. Recording media with this multilayer composite structure comprise a conductive base, a first layer containing charge carrier-producing compounds, and, on top of this layer, a second layer containing charge carrier-transporting substances. Composite structures of this type are described, inter alia, in German Laid-Open Application DOS No. 2,220,408. German Laid-Open Application DOS No. 2,237,539 discloses similar electrophotographic elements which contain dyes of the general formula I

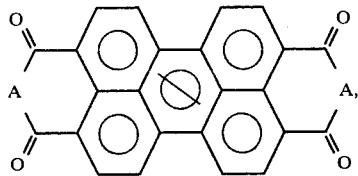

where A is oxygen or N-R, where R is hydrogen, alkyl or alkyphenyl, as charge carrier-producing compounds in the first layer.

These compounds are preferably applied to the conductive base by vapor deposition under greatly reduced pressure at above 300° C. They are red pigments. Oxadiazo compounds, for example, are preferred charge carrier-transporting substances for use in these elements.

It is an object of the present invention to provide very photosensitive electrophotographic recording media which contain organic photosemiconductors and which can be produced from a dye dispersion in a very simple manner, the electrophotographic element being flexible, resilient and resistant to abrasion.

We have found that this object is achieved with an electrophotographic recording medium which comprises
   (a) an electrically conductive base,
   (b) a first layer, from 0.005 to 5 μm thick, which contains charge carrier-producing dyes of a particular type, with or without a binder, and
   (c) a second layer, preferably about 2-40 μm thick, which is substantially transparent to actinic light and is composed of insulating organic materials containing one or more compounds which are charge carrier-transporting when exposed to light, with or without one or more active or inactive binders.

Adhesive and barrier layers may or may not be incorporated between the individual components (a), (b) and (c).

On examining the known dye of the general formula II

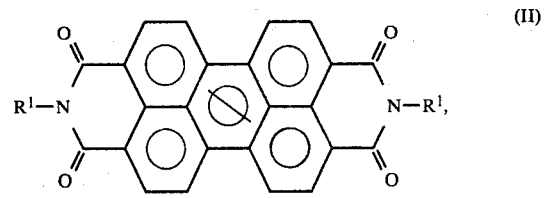

where $R_1$ is hydrogen, alkyl of up to 6 carbon atoms, β- or γ-hydroxyalkyl, β- or γ-alkoxyalkyl, pyrazolyl, imidazolyl or derivatives thereof, or preferably phenyl which is symmetrically or asymmetrically substituted by from one to three substituents, ie. dyes of the general formula III:

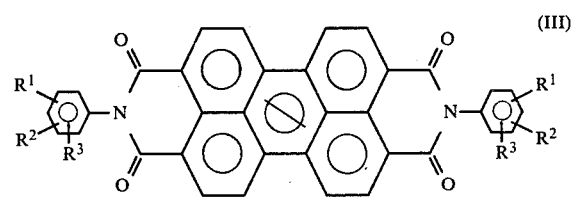

where $R^1$, $R^2$ and $R^3$ may be identical or different and each is hydrogen, methyl, ethyl, propyl, isopropyl, t-butyl, methoxy, ethoxy, butoxy, chlorine, bromine, carboxyl, carboxymethyl, phenylsulfonyl or phenylazo, or another similar radical, we have found, surprisingly, that the compound of the formula IV, ie. compound 1, perylene-3,4,9,10-tetracarboxylic acid N,N'-bis-(2',6'-dichlorophenyl)-diimide,

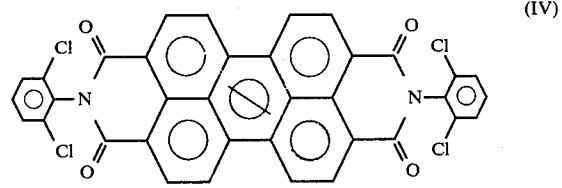

gives a particularly good electrophotographic recording medium when used in the first layer as a compound which is charge carrier-producing when exposed to actinic light.

Accordingly, the present invention relates to an electrophotographic recording medium in which the dye (IV) is effective as the charge carrier-producing component in the first layer.

The dye may be prepared in a known manner by condensation of perylene-3,4,9,10-tetracarboxylic acid, or its anhydride, with 2,6-dichloroaniline in a solvent or diluent, eg. quinoline, naphthalene or trichlorobenzene, or in a large excess of the aniline compound, at from 180° to 230° C. The reaction is advantageously carried out in the presence of an agent which accelerates the condensation, eg. zinc chloride, zinc acetate, zinc propionate or hydrochloric acid.

The very photosensitive, photoconductive double layer which is suitable for use in the novel electrophotographic recording medium and is obtained in accordance with the invention possesses high mechanical stability, and may be attached to the surface of a cylindrical drum or can run continuously as an endless belt, without exhibiting particular signs of wear. Accordingly, it is very suitable for use in electrophotographic copying machines. Compound IV according to the invention possesses excellent properties particularly in respect of the rate of the light-induced decrease in potential. That this result is surprising and not obvious is shown, in particular, by comparison with compounds possessing the same type of general properties as the N,N'-substituted perylene-3,4,9,10-tetracarboxylic acid diimides.

To prepare the novel electrophotographic recording medium, the first, charge carrier-producing layer is applied, as a dispersion, to the electrically conductive base. The dispersion used for the first layer is prepared by tumbling about 20–85 percent by weight, based on the solids content of the dispersion, of one or more of the dyes which are suitable according to the invention with 80–15 percent by weight of a binder which is conventionally used for this purpose and which may or may not possess the characteristics of a barrier layer, in the form of a solution in a highly volatile organic solvent.

The first layer is cast so that a dry layer about 0.005–5 μm, preferably 0.08–1.3 μm, thick results. An adhesive layer about 0.05–5 μm, preferably 0.1–0.8 μm, thick may be located between the base and the first layer.

The transparent second layer, preferably 2–40 μm thick, is located on top of the first layer, and is also cast from a solution. It is composed of from 30 to 60 percent by weight of one or more charge carrier-transporting compounds, from 65 to 35 percent by weight of one or more binders conventionally used for this purpose, and from 0.1 to 4 percent by weight of additives which improve the mechanical properties, with or without up to 5 percent by weight of sensitizers or activators. The layer is cast from a low-boiling solvent.

A barrier layer about 0.05 to 1.5 μm, preferably 0.1 to 0.5 μm, thick may be located between the first and second layers, and, depending on the intended use of the electrophotographic recording medium, it may be appropriate to apply an inactive, protective top layer to the charge carrier-transporting layer.

Suitable electrically conductive bases are aluminum foils, aluminum sheet or nickel sheet, or plastic films, preferably polyester films, coated by vapor deposition with aluminum, tin, lead, bismuth or a similar metal. The choice is influenced by the field of use of the electrophotographic element.

The barrier layer between the conductive base and the first layer, or between the latter and the second layer, usually consists of a metal oxide, eg. aluminum oxide, or a polymer, eg. a polyamide, polyvinyl alcohol, a polyacrylate or polystyrene, or a similar system. However, the binder of the first layer may also be used as the barrier layer material, if desired.

Polyacrylates, polymethacrylates, polyesters, polyphthalates, polyvinyl chlorides, styrene/maleic acid copolymers, epoxides and other conventional resins are suitable for accommodating the dyes according to the invention in the production of the charge carrier-producing layer which forms part of the novel electrophotographic recording medium.

Suitable binders for the second, charge carrier-transporting layer are in particular polyvinyl chloride, polyester resins, polyacetal resins, polycarbonates, polystyrene and polyurethanes, ie. those binders which are known by the skilled worker to possess special electrical properties. Thus, silicone resins, polyvinyl acetate, chlorinated rubber, cellulose esters, ethylcellulose and the like may also be used. Suitable charge carrier-transporting compounds present in this layer are those which do not adversely affect the transparency to visible light, for example (a) low molecular weight compounds, in particular heterocyclic compounds, eg. pyrazoline derivatives, oxazoles, oxadiazoles, phenylhydrazones, imidazoles, triphenylamine derivatives, carbazole derivatives and pyrene derivatives, and other, condensed aromatic compounds, and (b) polymeric materials, for example polyvinylpyrenes, poly-(N-vinylcarbazole) and copolymers of carbazole and styrene and/or vinyl acetate and/or vinyl chloride.

Of the polymers, poly-(N-vinylcarbazole) is particularly suitable.

The novel electrophotographic recording media may also contain further constituents to improve their mechanical properties. Thus, wetting agents, for example silicone oils, can improve the surface quality. Moreover, sensitizers or activators may additionally be incorporated into the upper, second layer. Examples of conventional sensitizers, which may be dispersed, are triphenylmethane dyes, xanthone dyes and soluble perylene derivatives, e.g. perylenetetracarboxylic acid esters. Compounds having a high electron affinity, for example nitro compounds, such as 2,4,7-trinitrofluoren-9-one, may be used as activators.

The invention is illustrated by Example 1, in comparison with other similar N,N'-substituted perylene-3,4,9,10-tetracarboxylic acid dimides.

EXAMPLE 1

5 g of the dye 1 were mixed with 3 g of a copolymer of vinyl chloride, acrylic acid and a maleic acid diester, and 25 g of tetrahydrofuran, and the mixture was tumbled on a roller-stand for 12 hours. Thereafter, 75 g of tetrahydrofuran and 25 g of toluene were added, and the mixture was homogenized on the roller-stand for one hour.

This dispersion was then applied with a knife-coater to a base of 175 μm thick untreated aluminum sheet. A 60 μm casting slot was used, and the speed of the knife-coater was 260 mm/minute. After the solvent had been allowed to evaporate off in the air and drying had been effected for 30 minutes at 90° C., a 0.75–0.8 μm thick dry layer resulted.

A solution of 47.75 g of poly-(N-vinylcarbazole), 5.2 g of dihexyl phthalate and 5.75 g of a polycarbonate of melting point 220°–230° C. in a mixture of 287.5 g of tetrahydrofuran and 74.25 g of toluene was applied to the first, high-hiding layer in each case. A casting slot of 140 μm was used, and the speed of the knife-coater was 260 mm/minute. After the solvent had been allowed to evaporate off in the air and drying had been effected for 30 minutes at 90° C., an 8–8.5 μm thick dry layer was obtained.

The electrophotographic recording material prepared in this manner was subjected to such a high voltage with a corona wire at a distance of 10 mm above the surface of the layer, that all electrophotographic recording media reached an equally high surface potential. After 20 seconds in the dark, the electrophotographic element was exposed for one second to light from a 150 watt xenon lamp, and the light-induced decrease in potential, as a percentage of the potential after it had decreased in the dark, was determined. Furthermore, the rate of the light-induced decrease in potential was determined in volts per second.

The results of the measurements are summarized in the Table.

COMPOUND 1

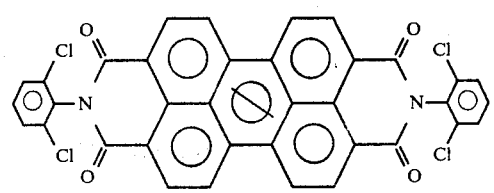

COMPARATIVE EXPERIMENTS 1 TO 17

The procedure described in Example 1 was followed, except that the compounds 2 to 18 were employed as dyes. The results of the measurements are summarized in the Table.

TABLE

| Compound | Light-induced decrease in potential in % | Rate of decrease in the potential on exposure to light, in volts per second |
|---|---|---|
| 1 | 96.6 | 10,450 |
| 2 | 71.6 | 2,680 |
| 3 | 92.5 | 6,930 |
| 4 | 90.6 | 7,120 |
| 5 | 87.2 | 6,420 |
| 6 | 88.0 | 5,750 |
| 7 | 91.5 | 4,100 |
| 8 | 78.3 | 3,950 |
| 9 | 90.0 | 6,470 |
| 10 | 45.2 | 710 |
| 11 | 85.0 | 3,770 |
| 12 | 88.6 | 3,300 |
| 13 | 70.8 | 3,860 |
| 14 | 50.3 | 1,050 |
| 15 | 23.4 | 340 |
| 16 | 75.7 | 2,540 |
| 17 | 87.1 | 3,410 |
| 18 | 86.5 | 3,830 |

COMPOUND 2

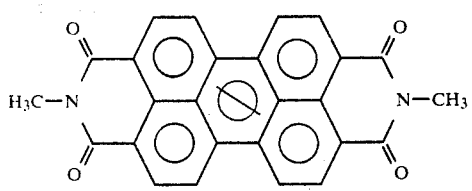

COMPOUND 3

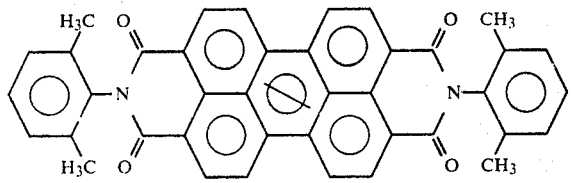

COMPOUND 4

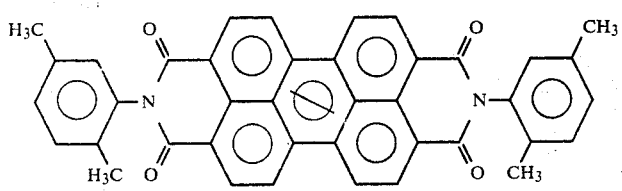

COMPOUND 5

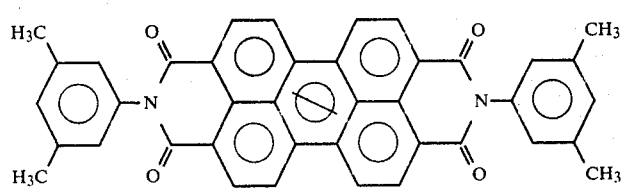

COMPOUND 6

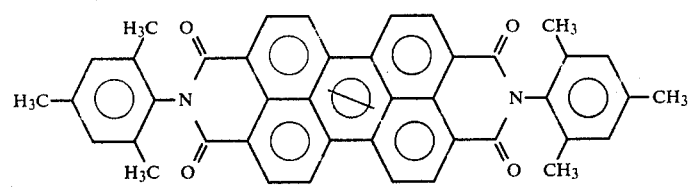

-continued
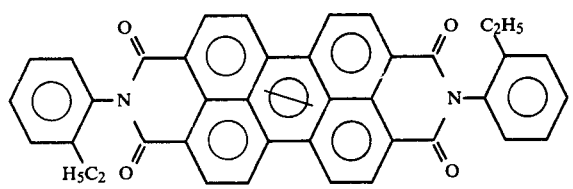
COMPOUND 7
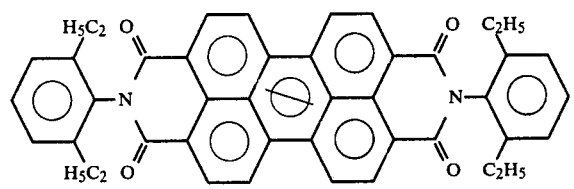
COMPOUND 8
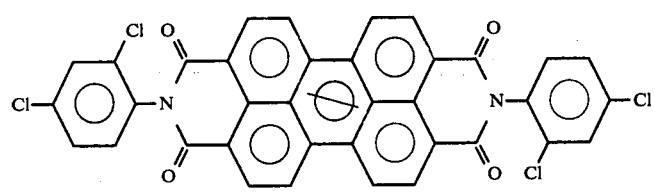
COMPOUND 9
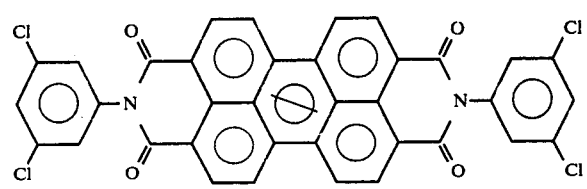
COMPOUND 10
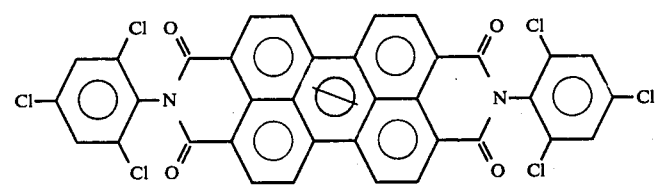
COMPOUND 11
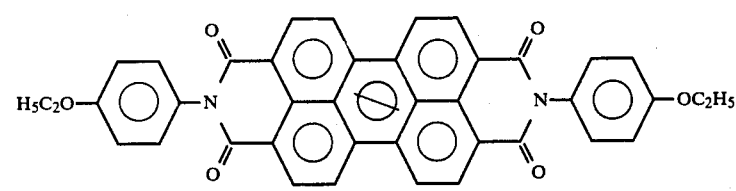
COMPOUND 12
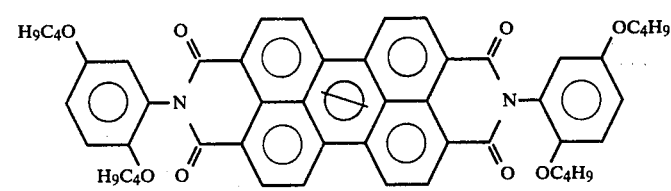
COMPOUND 13
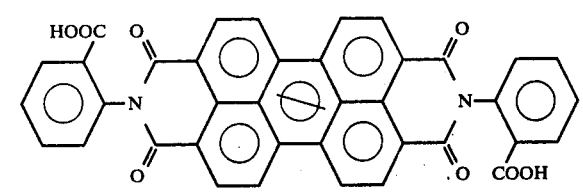
COMPOUND 14

-continued

COMPOUND 15
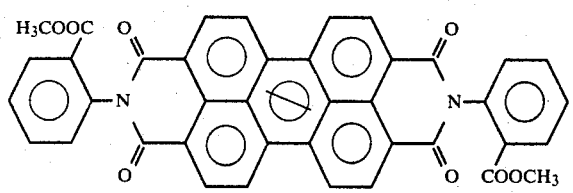

COMPOUND 16
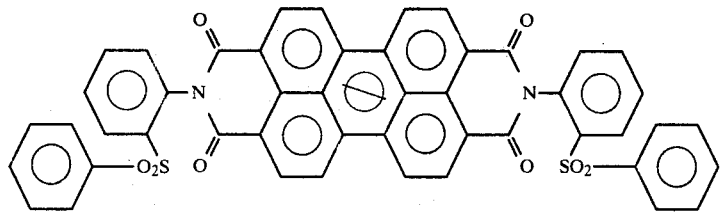

COMPOUND 17
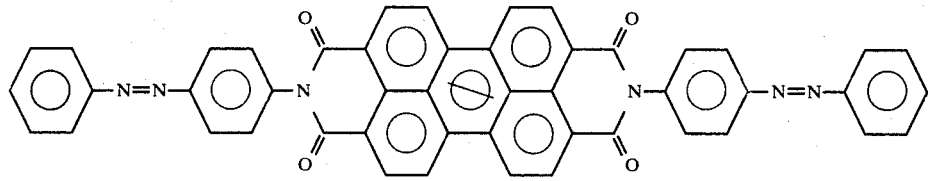

COMPOUND 18
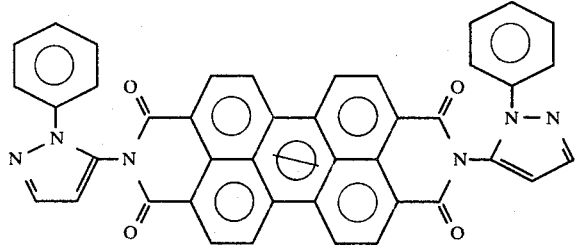

We claim:

1. An electrophotographic recording medium which consists essentially of an electrically conductive base, a first layer containing charge carrier-producing dyes, and a second layer which is substantially transparent to actinic light and is composed of an insulating organic material containing at least one compound which is charge carrier-transporting when exposed to light, wherein perylene-3,4,9,10-tetracarboxylic acid N,N'-bis-(2',6'-dichlorophenyl)-diimide is employed as the charge carrier-producing dye.

2. An electrophotographic recording medium as set forth in claim 1, wherein poly-(N-vinylcarbazole) is employed as the charge carrier-transporting compound.

* * * * *